US011518526B2

(12) United States Patent
Porte et al.

(10) Patent No.: US 11,518,526 B2
(45) Date of Patent: Dec. 6, 2022

(54) AIRCRAFT ENGINE NACELLE COMPRISING AN ANTI-ICING PROTECTION SYSTEM

(71) Applicant: Airbus Operations SAS, Toulouse (FR)

(72) Inventors: Alain Porte, Colomiers (FR); Jacques Lalane, Saint Orens de Gameville (FR); Gregory Albet, Grepiac (FR); Maxime Zebian, Saint-Sauveur (FR); Arnaud Bourhis, Plaisance du Touch (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 548 days.

(21) Appl. No.: 16/655,387

(22) Filed: Oct. 17, 2019

(65) Prior Publication Data

US 2020/0122843 A1   Apr. 23, 2020

(30) Foreign Application Priority Data

Oct. 19, 2018   (FR) ...................................... 1871238

(51) Int. Cl.
*B64D 15/04* (2006.01)
*B64D 29/00* (2006.01)
*B64D 33/02* (2006.01)

(52) U.S. Cl.
CPC ............. *B64D 15/04* (2013.01); *B64D 29/00* (2013.01); *B64D 33/02* (2013.01); *B64D 2033/0206* (2013.01); *B64D 2033/0233* (2013.01)

(58) Field of Classification Search
CPC ........ B64D 15/02; B64D 15/04; B64D 15/06; B64D 2033/0233; B64D 2033/0206; F01D 25/02; F02C 7/047
See application file for complete search history.

(56) References Cited

U.S. PATENT DOCUMENTS

| 4,674,714 A * | 6/1987 | Cole ...................... B64D 15/04 138/104 |
| 4,921,041 A * | 5/1990 | Akachi ............... F28D 15/0266 165/47 |
| 6,027,078 A * | 2/2000 | Crouch ................... B64C 21/00 244/130 |
| 8,448,901 B2 * | 5/2013 | Porte ..................... B64D 15/04 244/134 B |

(Continued)

FOREIGN PATENT DOCUMENTS

| EP | 1895123 A2 | 3/2008 |
| EP | 1942249 A2 | 7/2008 |

(Continued)

OTHER PUBLICATIONS

French Search Report; priority document.

*Primary Examiner* — Richard R. Green
*Assistant Examiner* — Arfan Y. Sinaki
(74) *Attorney, Agent, or Firm* — Greer, Burns & Crain, Ltd.

(57) ABSTRACT

An anti-icing protection system for an aircraft engine nacelle, the nacelle comprising an inner shroud provided with at least one acoustic panel, an air intake lip forming a leading edge of the nacelle, the protection system comprising a heat exchanger device including at least one heat pipe configured to transfer heat emitted by a heat source to the acoustic panel or panels.

17 Claims, 6 Drawing Sheets

(56) References Cited

U.S. PATENT DOCUMENTS

| | | | | |
|---|---|---|---|---|
| 10,533,497 B2* | 1/2020 | Welch | ............... | F02C 7/30 |
| 2008/0053100 A1* | 3/2008 | Venkataramani | ......... | F02C 7/14 |
| | | | | 60/772 |
| 2008/0159852 A1 | 7/2008 | Stephenson et al. | | |
| 2010/0199629 A1* | 8/2010 | Chene | ............... | F02C 7/045 |
| | | | | 60/39.093 |
| 2011/0131945 A1* | 6/2011 | Vauchel | ............... | B64D 33/02 |
| | | | | 428/116 |
| 2011/0133025 A1* | 6/2011 | Vauchel | ............... | F02C 7/045 |
| | | | | 244/1 N |
| 2011/0139927 A1* | 6/2011 | Porte | ............... | B64D 15/04 |
| | | | | 244/1 N |
| 2012/0048389 A1* | 3/2012 | Chelin | ............... | B64D 15/04 |
| | | | | 137/15.1 |
| 2012/0317782 A1* | 12/2012 | Porte | ............... | B64D 33/02 |
| | | | | 29/428 |
| 2012/0318029 A1* | 12/2012 | Porte | ............... | B21D 47/00 |
| | | | | 72/54 |
| 2013/0098471 A1* | 4/2013 | Porte | ............... | B64D 33/02 |
| | | | | 137/15.1 |
| 2013/0224000 A1* | 8/2013 | Porte | ............... | B64D 15/04 |
| | | | | 415/182.1 |
| 2014/0001284 A1* | 1/2014 | Porte | ............... | B64D 33/02 |
| | | | | 239/265.11 |
| 2014/0165570 A1* | 6/2014 | Herring | ............... | F02C 7/14 |
| | | | | 60/730 |
| 2020/0108942 A1* | 4/2020 | Laly | ............... | B64D 33/02 |

FOREIGN PATENT DOCUMENTS

| | | |
|---|---|---|
| EP | 2578842 A2 | 4/2013 |
| JP | H042595 A | 1/1992 |

* cited by examiner

AIRCRAFT ENGINE NACELLE COMPRISING AN ANTI-ICING PROTECTION SYSTEM

CROSS-REFERENCES TO RELATED APPLICATIONS

This application claims the benefit of the French patent application No. 1871238 filed on Oct. 19, 2018, the entire disclosures of which are incorporated herein by way of reference.

FIELD OF THE INVENTION

The present invention relates to an aircraft engine nacelle comprising a system for protecting an air intake against icing.

BACKGROUND OF THE INVENTION

The leading edges of aircraft, in particular, the air intake lips of the aircraft engine nacelles, may by subject to the formation of ice, which builds up to form blocks of ice. The formation of these blocks of ice may interfere with the supply of air to the engine. For example, blocks of ice may come loose and collide with the engine fan blades. The fan blades are therefore liable to be weakened, or even broken, thereby.

There exists an anti-icing protection system that bleeds hot air from compression stages of the aircraft engine in order to inject it into an annular space located behind the lip of the nacelle. The hot air then flows through the annular space, heats the lip and is sent into channels in acoustic panels in order to heat the skin of the acoustic panels. However, the skin of the acoustic panels is heated over a short distance, which results in deicing over a short distance. This distance may be insufficient for very short air intakes. Specifically, the shortening of the air intakes may result in the surface of the acoustic panels becoming aerodynamically more sensitive.

SUMMARY OF THE INVENTION

An object of the present invention is to overcome these drawbacks by providing an anti-icing protection system for a nacelle.

To this end, the invention relates to an aircraft engine nacelle comprising an anti-icing protection system, the nacelle comprising an inner shroud provided with at least one acoustic panel.

According to the invention, such a protection system comprises a heat exchanger device including at least one heat pipe configured to transfer heat emitted by a heat source to the one or more acoustic panels.

Thus, due to the invention, the acoustic panels are more effectively and cost-efficiently protected from icing by virtue of the one or more heat pipes. The heat emitted by a heat source is used to deice all of the acoustic panels of the nacelle rather than just a portion of the acoustic panels located in the vicinity of the lip.

According to particular embodiments that can be considered in isolation or in combination:

the heat exchanger device further comprises a heat-transfer fluid, at least one evaporator connected thermally to the heat source, the evaporator or evaporators being configured to extract at least some of the heat supplied by the heat source, the extracted heat being transferred to the heat-transfer fluid, at least one condenser positioned close to the acoustically resistive porous layer, the condenser or condensers being configured to supply at least some of the heat extracted by the evaporator or evaporators to the acoustic panel or panels, the extracted heat being transferred to the condenser or condensers via the heat-transfer fluid, each of the evaporators being fluidically connected to at least one condenser via at least one heat pipe in which the heat-transfer fluid circulates.

the heat pipe or heat pipes comprise at least one liquid pipe configured to convey, from the condenser to the evaporator, the heat-transfer fluid liquefied by cooling in the condenser.

the heat pipe or heat pipes are pulsating heat pipes. This feature avoids repeated maintenance operations.

the heat pipe or heat pipes are loop heat pipes. This feature avoids repeated maintenance operations.

the heat pipe or heat pipes comprise at least one capillary tube containing a constant-volume fluid.

the nacelle comprises a lip extended on the inside by an inner shroud provided with at least one acoustic panel made up of a reflective layer impermeable to sound waves, of at least one honeycomb structure and of an acoustically resistive porous layer. The lip has an annular space closed off by a front frame provided with an orifice. The nacelle comprises means for blowing hot air into the annular space as well as a wall fixed to the front frame, arranged above the acoustic panel, and substantially parallel to the panel, the wall creating a canal that allows the hot air removed from the annular space to pass through the orifice. The nacelle further comprises a heat exchanger device comprising at least one heat pipe comprising at least one evaporator arranged in contact with that layer of the acoustic panel that is reflective and impermeable to sound waves, and at least one condenser, arranged near the acoustically resistive porous layer.

the heat pipe or heat pipes are substantially U-shaped. Thus, the shape of the heat pipe or heat pipes will adapt to suit the geometry and the dimensions of the lip of the nacelle.

the heat pipe or heat pipes are substantially S-shaped. Thus, the shape of the heat pipe or heat pipes will adapt to suit the geometry and the dimensions of the lip of the nacelle.

the heat pipe or heat pipes are arranged in an axial direction of the nacelle. Thus, the shape of the heat pipe or heat pipes will adapt to suit the geometry and the dimensions of the lip of the nacelle.

the heat pipe or heat pipes are arranged in a circumferential direction of the nacelle. Thus, the shape of the heat pipe or heat pipes will adapt to suit the geometry and the dimensions of the lip of the nacelle.

the evaporator or evaporators are arranged inside the honeycomb structure, that layer of the acoustic panel that is reflective and impermeable to sound waves being manufactured from a material that is a conductor of heat. This feature will ensure effective heat transfer by virtue of the thermal properties of the reflective layer.

the evaporator or evaporators are arranged in the canal that allows the hot air removed from the annular space to pass through the orifice, in direct contact with the hot air. The transfer of heat to the evaporator or evaporators will be more effective because it is direct.

the condenser or condensers are interposed between the honeycomb structure and the acoustically resistive porous layer.

the condenser or condensers are arranged in contact with the acoustically resistive porous layer, the layer being manufactured from a material that is a conductor of heat. This feature will ensure effective heat transfer by virtue of the thermal properties of the resistive layer, and will improve the deicing of the lip.

the aircraft engine nacelle comprises an inner shroud provided with at least one acoustic panel, an air intake lip forming a leading edge of the nacelle and exhibiting an annular space and an internal face, the annular space being closed off by an internal front frame and being designed to receive a supply of hot air. The evaporator or evaporators are fixed to the internal face of the lip and are configured to extract at least some of the heat supplied by the hot air being supplied to the annular space of the lip, the extracted heat being transferred to the heat-transfer fluid.

the aircraft engine nacelle comprises a sealing device interposed between the heat pipe or heat pipes and the bottom part of the front frame.

the sealing device comprises notches that have the same shapes and dimensions as the at least one liquid pipe.

BRIEF DESCRIPTION OF THE DRAWINGS

The invention will be better understood on reading the following description and on examining the appended figures.

DETAILED DESCRIPTION OF THE PREFERRED EMBODIMENTS

Figure 2:
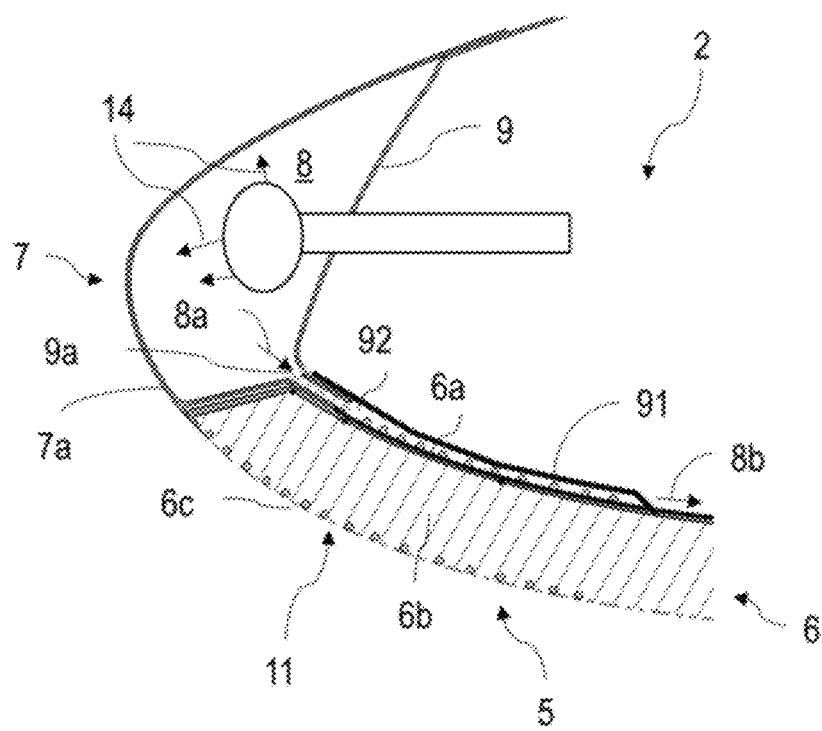
FIG. 2 depicts a longitudinal section through a lip comprising the anti-icing protection system according to a first embodiment.

FIG. 2 schematically depicts one embodiment of an anti-icing protection system for an aircraft engine 3 nacelle 2.

Figure 1:
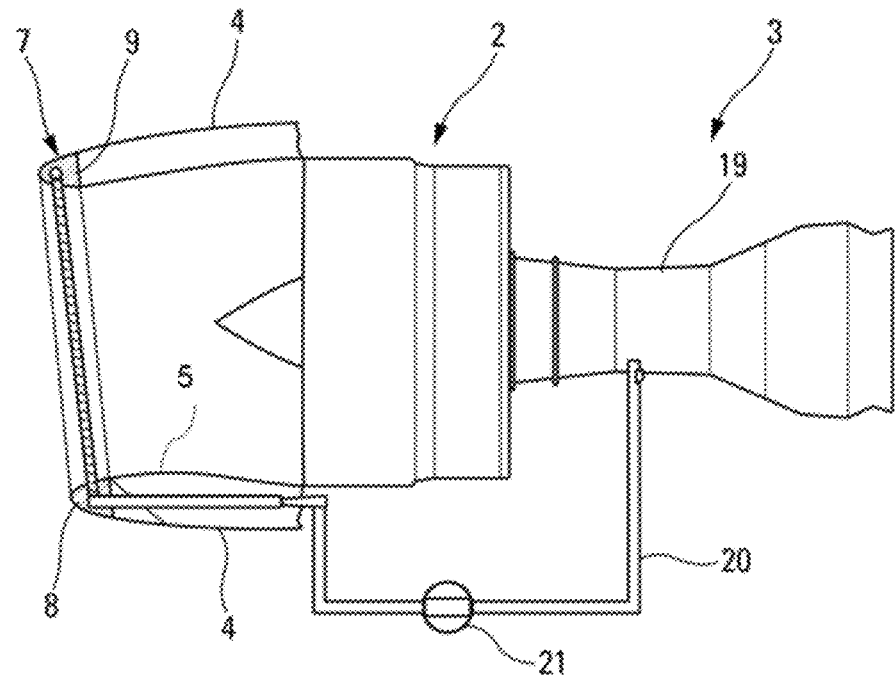
FIG. 1 depicts a side view of an aircraft engine comprising a supply of hot air to the annular space of the lip.

An engine 3 nacelle 2 refers to a fairing surrounding an aircraft engine 3 as illustrated in FIG. 1, such as an aircraft turbofan.

The nacelle generally comprises an outer shroud 4, an inner shroud 5 and an air intake lip 7. The two shrouds 4 and 5 are generally coaxial and form a space between them. The lip 7 joins the two shrouds 4 and 5 together.

The outer shroud 4 forms an outer cowl of the nacelle 2. The inner shroud 5 is provided with at least one acoustic panel 6. The lip 7 forms a leading edge of the nacelle 2 and comprises an internal face 7a.

FIG. 2 depicts a nacelle 2 which is usually equipped with acoustic panels 6 covering the internal wall of the nacelles 2 in the region of the air intakes upstream of the fans 22. Generally, the acoustic panels 6 have a sandwich structure including one or more layers of honeycomb-like cellular structure 6b suitable for trapping noise. This layer of honeycomb structure 6b has an internal face covered with a reflective layer 6a that is impermeable to sound waves, and an external face covered with an acoustically resistive porous layer 6c. Several blocks of acoustic panels (PA, PA-1, etc.) may be assembled with one another in order to form an acoustic covering, the length of which is suited to the air intake to which they are fixed.

The protection system 1 comprises a heat exchanger device 11 configured to transfer heat 14 emitted by a heat source to the acoustic panel or panels 6.

The heat exchanger device 11 comprises at least one heat pipe 12 configured to convey the heat 14 from the heat source to the acoustic panel or panels 6.

A heat pipe 12 generally refers to a heat-conducting element operating according to the principle of heat transfer by phase transition of a fluid.

According to a first embodiment depicted in FIG. 2, FIG. 3, FIG. 4 and FIG. 5, the lip 7 has an annular space 8 closed off by a front frame 9. The front frame 9 separates the annular space 8 from the rest of the space formed between the two shrouds 4 and 5.

The nacelle 2 further comprises means for blowing hot air into the annular space. Specifically, if need be, the leading edge of the nacelle 2 is deiced by heating by a heat source, generally pressurized hot air bled from the engine 3 which is conveyed to the leading edge by a pressurized hot air circulation circuit (depicted schematically in FIG. 2).

The nacelle 2 additionally comprises a wall 91 fixed to the front frame 9, arranged above the acoustic panel 6 and substantially parallel to the panel, the wall 91 creating, with the reflective layer 6a that is impermeable to sound waves, a canal 92.

The front frame 9 is provided with an orifice 9a that allows the hot air removed from the annular space 8 to be conveyed through the orifice 9a towards the canal 92 (arrow 8a).

In this embodiment, the heat exchanger device 11 may be arranged in a circumferential direction of the nacelle 2.

Figure 3:
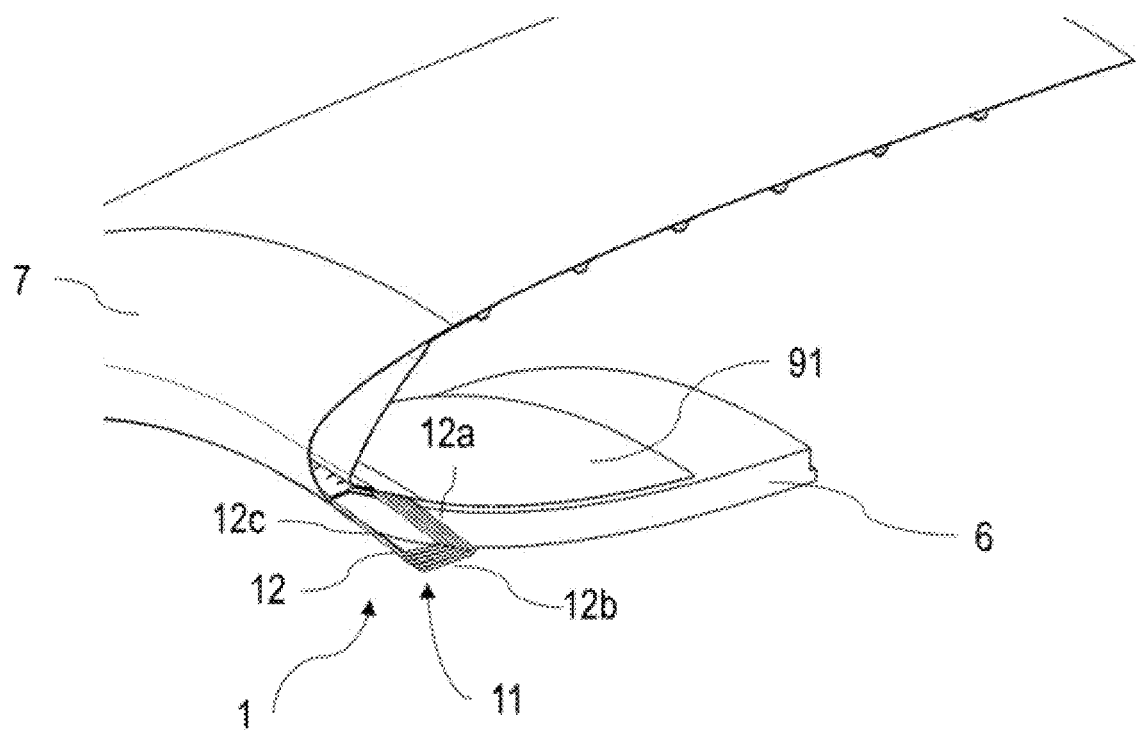
FIG. 3 depicts a view in cross section through a lip comprising the anti-icing protection system according to a first embodiment.
Figure 4:
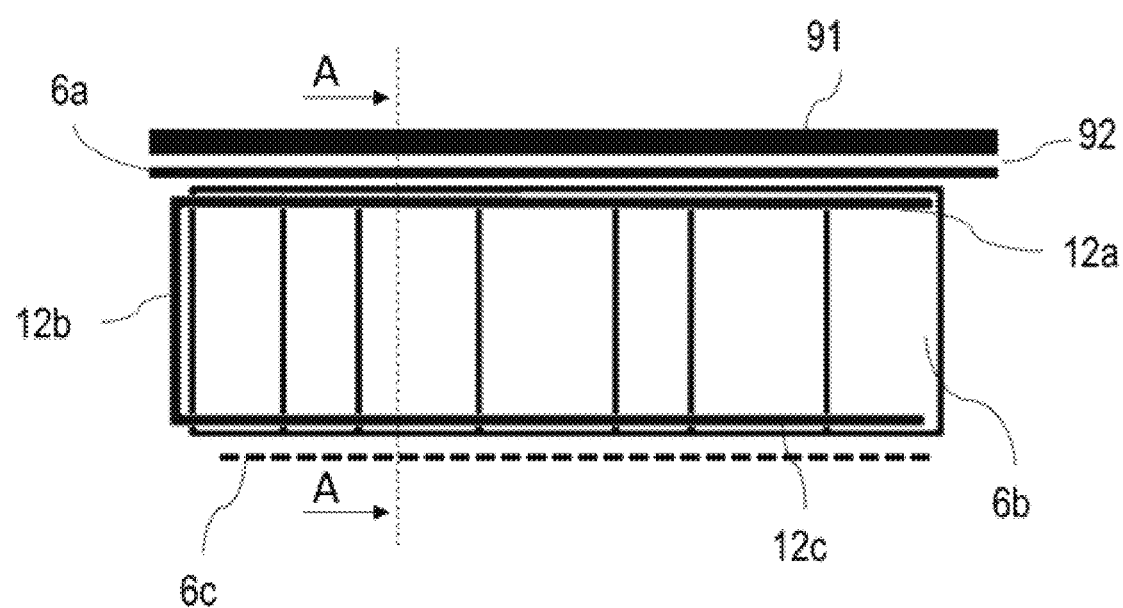
FIG. 4 depicts a schematic view of the anti-icing protection system according to a first embodiment.

The heat exchanger device 11 further comprises a heat-transfer fluid and at least one evaporator 12a arranged in contact with that layer 6a of the acoustic panel 6 that is reflective and impermeable to sound waves, and at least one condenser 12c, arranged inside the honeycomb structure 6b near the acoustically resistive porous layer 6c as illustrated in FIG. 3 and FIG. 4. The various elements that make up the anti-icing protection system 1 have been depicted not touching one another, in order to make the system 1 easier to understand. However, it must be understood that the reflective layer 6a, the honeycomb structure 6b, and the porous layer 6c are manufactured in such a way that they do touch one another.

The evaporator or evaporators 12a are configured to extract at least some of the heat supplied by the heat source. The heat is then transferred to the heat-transfer fluid.

Thus, the heat extracted by the evaporator or evaporators 12a is transferred to the condenser or condensers 12c via the heat-transfer fluid. The condenser or condensers 12c are configured to deliver at least some of the heat extracted by the evaporator or evaporators 12a to the acoustically resistive porous layer 6c.

Advantageously, the heat pipe may be a pulsating heat pipe (PHP). It comprises a sequence of capillary tubes containing a constant-volume fluid present in two phases, liquid and gas. The heat present on the side of the reflective layer 6a will cause the liquid to vaporize into bubbles of gas at the evaporator 12a, causing the pressure to increase. The cold (ice) present on the side of the porous layer 6c will convert the bubbles into liquid at the condenser 12c and cause a depression. This pressure gradient will allow the bubbles to move from the evaporator 12a to the condenser 12c and allow liquid to move from the condenser 12c to the evaporator 12a, thus giving rise to a transfer of heat.

Advantageously, the heat pipe 12 may be a loop heat pipe (LHP). The advantages of such a heat pipe are, in particular, that the heat transfer characteristics are better than with other types of heat pipe and that, whatever the position of the heat pipe, it maintains optimal operation.

The fluid used in the heat pipe 12 is a fluid that meets the aeronautical requirements (with regard to fire, smoke, etc.) and the extreme conditions of flight (with regard to temperature, pressure, etc.).

The evaporators 12a (or, respectively, the condensers 12c) may be spaced apart by a distance of from 3 mm to 15 mm depending on the desired quality of deicing, the diameter of the evaporators 12a and of the condensers 12c being able to vary from 3 mm to 4 mm.

Furthermore, the heat pipe or heat pipes 12 comprise at least one capillary tube containing a constant-volume fluid.

In this first embodiment, the heat exchanger device 11 is in the shape of a U. In this embodiment, the heat pipe 12 has been bent over on itself to form a U, as depicted in FIG. 4. The evaporators 12a and the condensers 12c are therefore substantially parallel to one another. As a result, the evaporators 12a and the condensers 12c are both arranged in the same block PA of acoustic panel 6.

Figure 5:
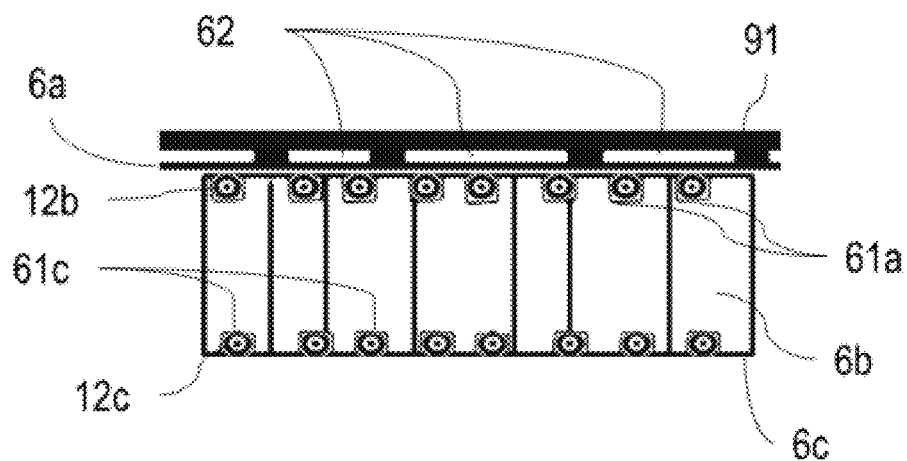
FIG. 5 depicts a view in section on AA of the anti-icing protection system according to a first embodiment.

FIG. 5 depicts a view of the anti-icing protection system 1 in section on AA. In order to manufacture such a system, grooves 61a are machined in the honeycomb structure 6b of the cells of the honeycomb structure 6b that will be in contact with the reflective layer 6a impermeable to sound waves. Likewise, grooves 61c are machined in the honeycomb structure 6b in the cells of the structure which will be in contact with the acoustically resistive porous layer 6c. The reflective layer 6a is preferably made from a material that is a conductor of heat so as to ensure effective vaporization of the heat-transfer liquid. This material could, for example, be a metallic material such as aluminum. This reflective layer 6a may comprise hot-air canals 62 in order better to channel the hot air removed from the annular space 8 and passing along the canal 92. For the same reason given for the reflective layer 6a, the porous layer 6c may be manufactured from a material that is a conductor of heat, for example from a metallic material such as aluminum. On account of the good thermal conductivity of the material used for the porous layer 6c, ice present in this zone is eliminated.

One way of manufacturing the protection system 1 according to this first embodiment will now be described. First of all, the heat pipes 12 (i.e., the evaporators 12a and the condensers 12c) are shaped into a U by bending the heat pipe 12. Secondly, the evaporator or evaporators 12a (or, respectively, the condenser or condensers 12c) bonded into the grooves 61a (or, respectively, 61c) machined beforehand in the cells of the honeycomb structure 6b. Next, the acoustic panel 6 is manufactured using conventional methods known to those skilled in the art, for example by laying up (draping) the acoustically resistive porous layer 6c, the honeycomb structure 6b comprising the heat pipes 12, and the reflective layer 6a that is impermeable to sound waves.

Advantageously, a shell comprising crenellations may then be bonded to the reflective layer 6a of the acoustic panel 6 in order to form the hot-air canals 62.

Figure 6:
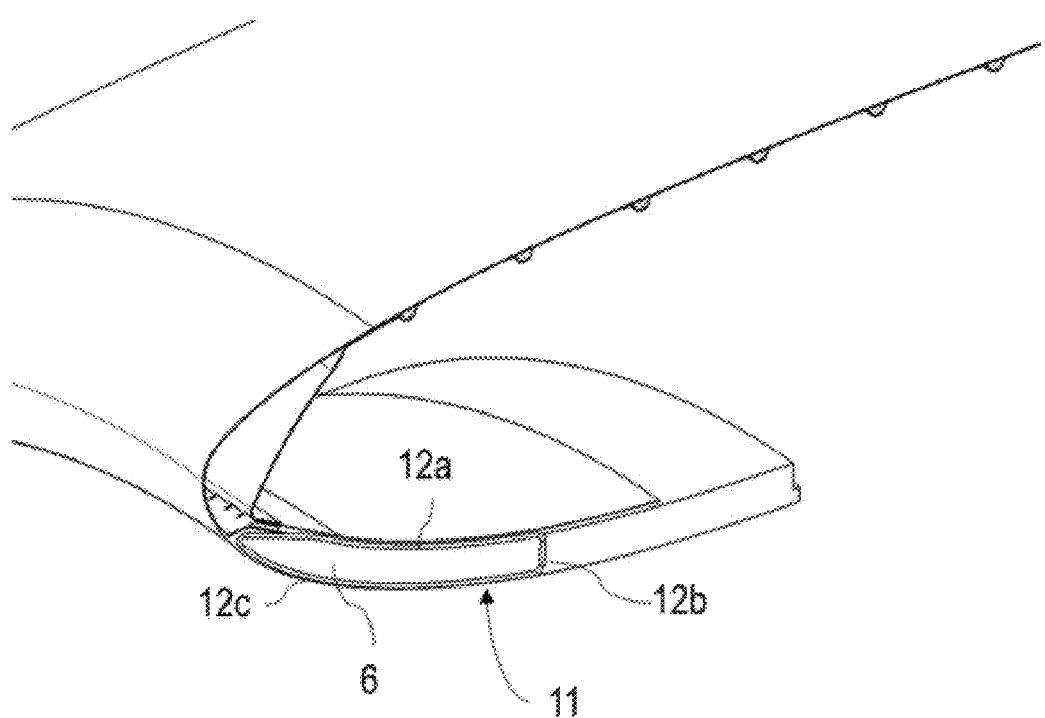
FIG. 6 depicts a view in cross section through a lip comprising the anti-icing protection system according to a second embodiment.
Figure 7:
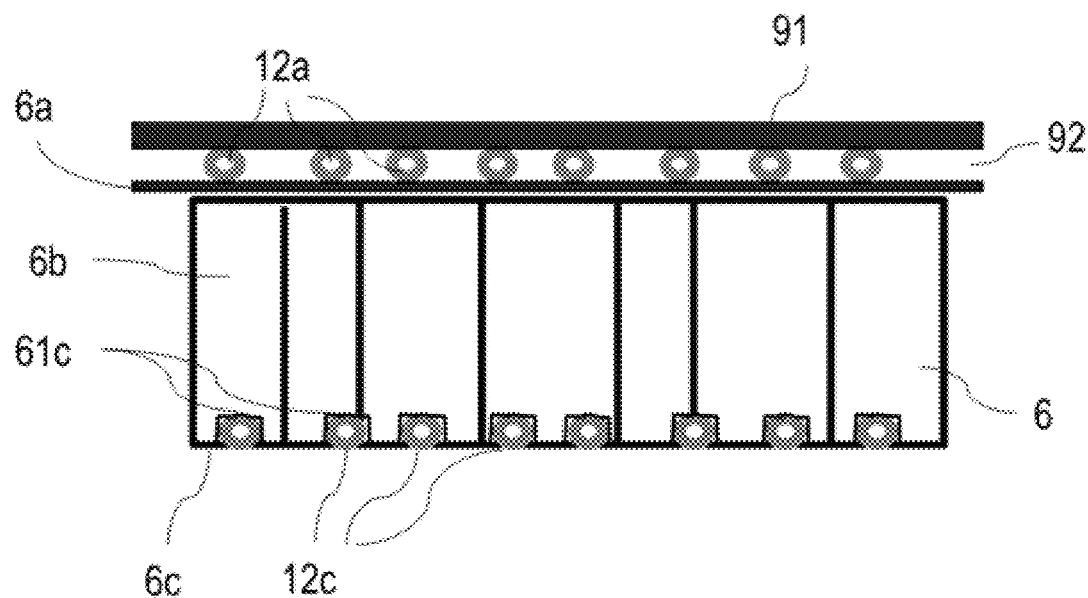
FIG. 7 depicts a schematic view of the anti-icing protection system according to a second embodiment.
Figure 8:
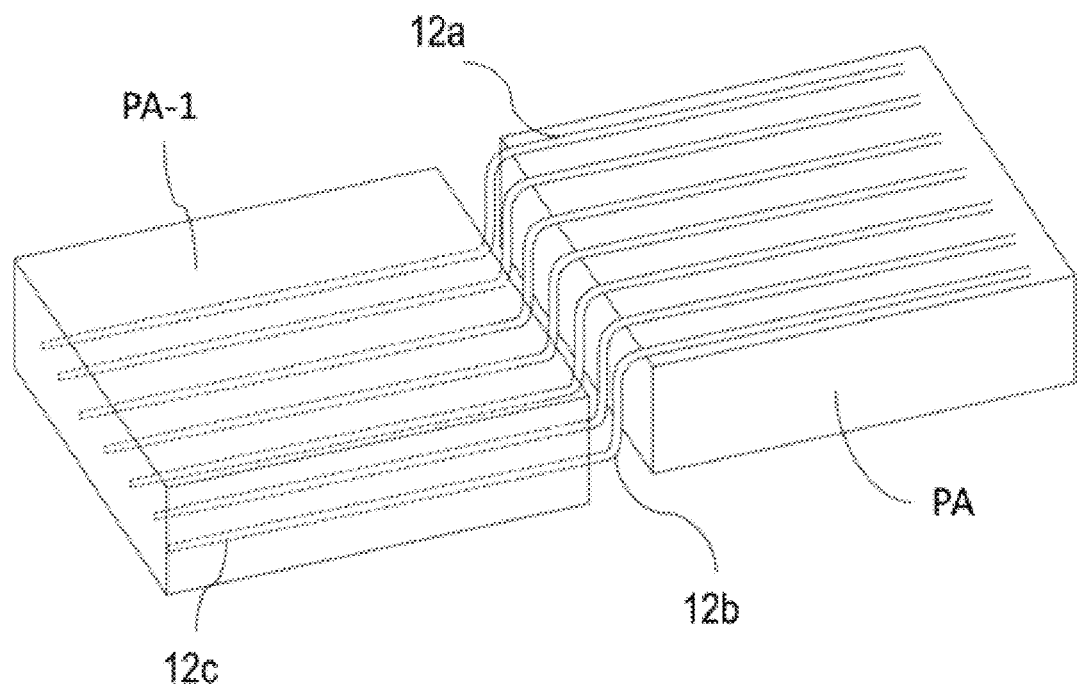
FIG. 8 depicts a schematic view of a lip comprising the anti-icing protection system according to a second embodiment.

According to a second embodiment of the invention, depicted in FIG. 6, FIG. 7 and FIG. 8, the heat device 11 takes the shape of an S. FIG. 6 depicts heat pipes 12 which may be arranged in an axial direction of the nacelle 2. In this example, the heat pipe 12 can be bent into the shape of an S (FIG. 7 and FIG. 8). The evaporators 12a and the condensers 12c are then bent on either side of the liquid pipe 12b so as to form substantially the shape of an S. In this embodiment, the evaporators 12a and the condensers 12c are not arranged in the same blocks (PA, PA-1) of acoustic panels 6. Specifically, as can be seen in FIG. 8, an evaporator 12a is placed on one block of acoustic panel PA whereas the corresponding condenser 12c is installed in the lower part of the previous block PA-1.

According to this embodiment depicted in FIG. 7, the evaporator 12a is installed in the canal 92 that allows the hot air removed from the annular space 8 to pass through the orifice 9a in contact with the reflective layer 6a. This particular arrangement allows direct contact between the hot air removed from the annular space 8 and the evaporator 12a, thus encouraging the vaporization of the heat-transfer fluid. The condenser 12c for its part, is fixed (for example by bonding) against the porous layer 6c. According to this embodiment, the reflective layer 6a need not necessarily be made from a metallic material, but can be manufactured from a conventional material.

The evaporator or evaporators 12a arranged in contact with the reflective layer 6a, by direct contact between the air circulating along the canal 92 and the evaporator or evaporators 12a, extract the heat circulating in the canal 92. Heat-transfer fluid vaporized in the evaporator or evaporators 12a is conveyed to the condenser or condensers 12c by the liquid pipe or pipes 12b of the heat pipe or heat pipes 12. The heat is therefore transmitted to the porous layer 6c. As a result, the ice present in these zones is eliminated.

In order to manufacture such an anti-icing protection system 1, grooves 61c are machined in the honeycomb structure 6b of the cells of the structure that will be in contact with the acoustically resistive porous layer 6c. In order to guarantee effective vaporization of the heat-transfer fluid, the porous layer 6c may be manufactured from a material that is a conductor of heat, for example from a metallic material such as aluminum. On account of the good thermal conductivity of the material used for the porous layer 6c, ice present in this zone is eliminated.

First of all, the heat pipes 12 (i.e., the evaporators 12a and the condensers 12c) are shaped into an S by bending the heat pipe 12. The condensers 12c are then bonded into the grooves 61c machined beforehand in the cells of the honeycomb structure 6b. Next, the various acoustic panels 6 that make up the blocks PA-1 are manufactured using conventional methods known to those skilled in the art, for example by laying up (draping) the acoustically resistive porous layer 6c, the honeycomb structure 6b comprising the condensers 12c, and the reflective layer 6a that is impermeable to sound waves. The evaporator 12a is then bonded on top of that layer 6a of the acoustic panel 6 of the block PA that is reflective and impermeable to sound waves. To finish, the joint between the panels 6 of the blocks PA and PA-1 is sealed, using any suitable means known to those skilled in the art.

For preference, whatever the embodiment, the evaporators 12a are distributed over the entirety of that layer 6a of the acoustic panels 6 that is reflective and impermeable to sound waves. Likewise, the condensers 12c are distributed over the entirety of the acoustically resistive porous layer 6c of the acoustic panels 6.

The hot air supplied to the annular space 8 may come from a conventional aircraft air-heating device known to those skilled in the art. The air-heating device is then configured to produce the hot air supplied to the annular space 8 of the nacelle 2.

Thus, the heating device supplies hot air to the annular space 8 of the lip 7. The hot air then circulates in the annular space 8 of the lip 7 and is removed towards the canal 92 via the orifice 9a. The heat circulating in the canal 92 is then extracted by the evaporator or evaporators 12a arranged in contact with the reflective layer 6a impermeable to sound waves. To do this, the heat-transfer fluid in the evaporator or evaporators 12a is vaporized and is conveyed to the condenser or condensers 12c by the liquid pipe 12b of the heat pipe or heat pipes 12. The heat is transmitted to the acoustically resistive porous layer 6c via the condenser or condensers 12c in which the heat-transfer fluid liquefies, supplying the heat to the condensers 12c. The liquefied heat-transfer fluid then returns to the evaporator or evaporators 12a via the liquid pipe 12b.

The evaporator or evaporators 12a arranged in contact with the reflective layer 6a extract the heat circulating in the canal 92, this being a step that is encouraged by the good thermal conductivity of the material used. Heat-transfer fluid vaporized in the evaporator or evaporators 12a is conveyed to the condenser or condensers 12c by the liquid pipe or pipes 12b of the heat pipe or heat pipes 12. The heat is then transmitted to the porous layer 6c and the ice present in these zones is eliminated.

Nonlimitingly, the air blown into the annular space 8 is generally heated to temperatures ranging from 250° C. to 450° C.

Figure 9:
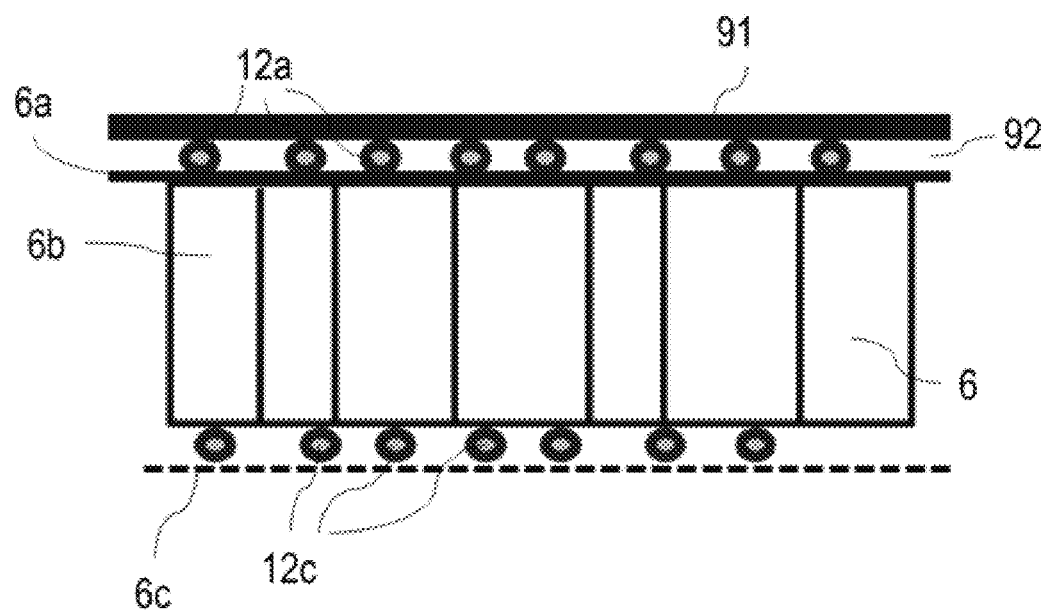
FIG. 9 depicts a schematic view of a lip comprising the anti-icing protection system according to a third embodiment.

According to a third embodiment illustrated in FIG. 9, the condenser or condensers 12c are interposed between the honeycomb structure 6b and the acoustically resistive porous layer 6c. According to this embodiment, there is no need to machine the honeycomb structure 6b. The condenser or condensers are fixed to the honeycomb structure by any fixing means known to those skilled in the art, such as, nonlimitingly, by bonding. The porous layer 6c is then fixed to the condenser or condensers 12c. It is also possible, during the manufacture of an acoustic panel 6 comprising one or more condensers 12c to consider positioning the condensers on the honeycomb structure 6b and then lay (draping) the acoustically resistive porous layer 6c over the condensers 12c before consolidating the whole. The advantage of such an acoustic panel is that it is easy to produce.

What has been presented is an anti-icing protection system 1 arranged in the circumferential direction of the nacelle 2 and having U-shaped heat pipes 12. However, the heat pipes 12 can perform their function just as well if they are S-shaped. Likewise, what has been presented is an anti-icing protection system 1 arranged in the axial direction of the nacelle 2 and having S-shaped heat pipes 12. However, the heat pipes 12 can perform their function just as well if they are U-shaped.

This anti-icing protection system 1 therefore allows effective transfer of heat from the canal 92 to the acoustic panels 6 by virtue notably of the proximity of the evaporators 12a and of the condensers 12c. Furthermore, the protection system 1 makes it possible to use the heat circulating along the canal 92 and therefore make more efficient use of the heat supplied by the heat source. Finally, because the temperature of the hot air present in the canal is lowered by virtue of the heat transfers with the evaporators 12a, this air can be removed in the nacelle without the risk of damaging the surrounding structure (arrow 8b).

Finally, the presence of the condensers does not impair the acoustic sound deadening of the acoustic panel 6.

Figure 10:
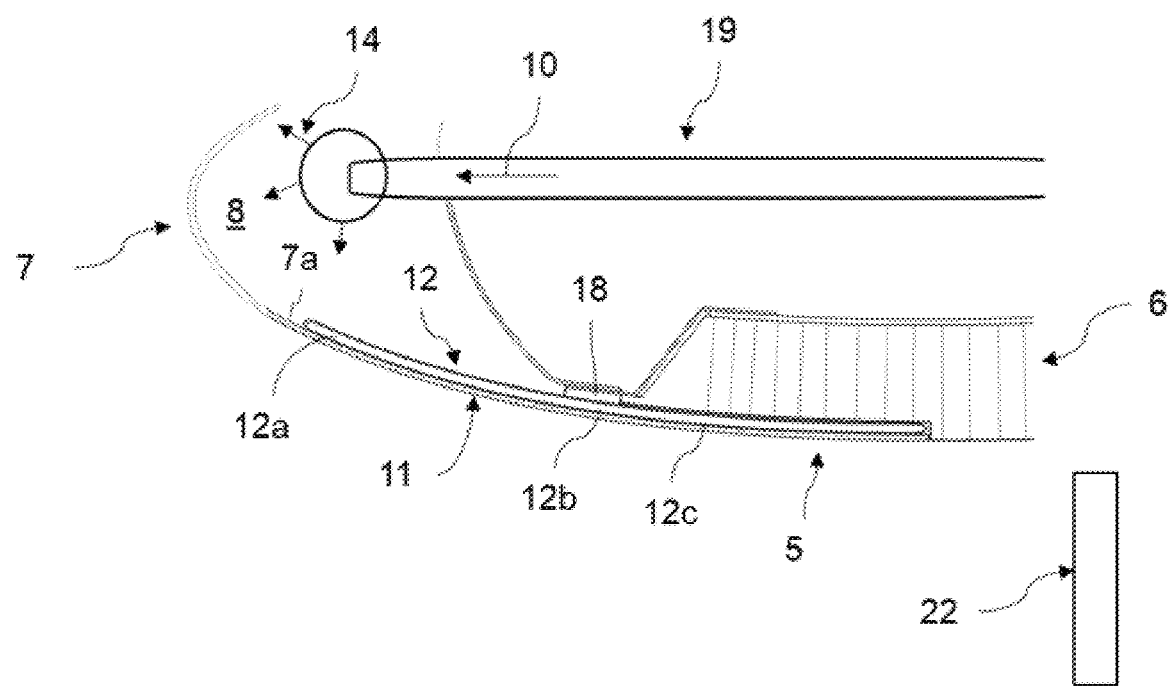
FIG. 10 depicts a longitudinal section through a lip comprising the anti-icing protection system according to a fourth embodiment.
Figure 11:
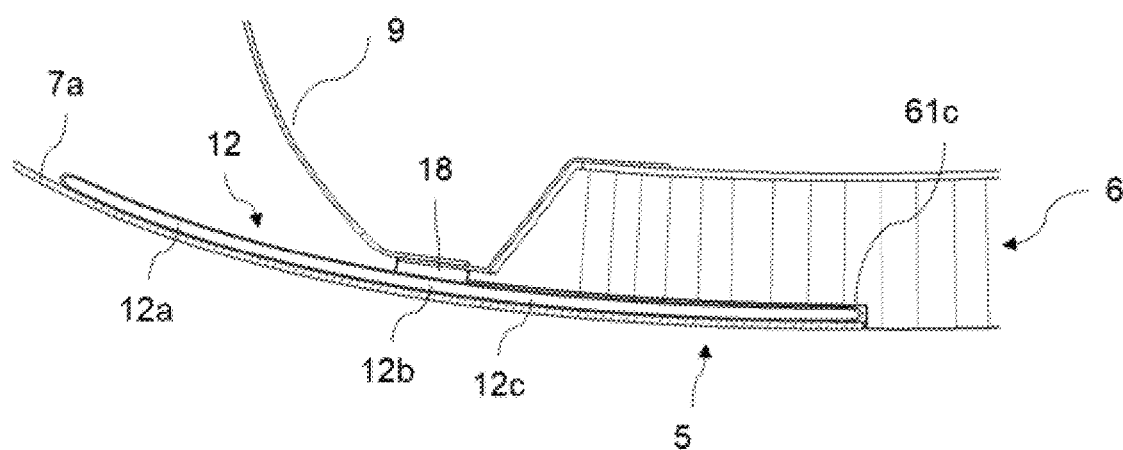
FIG. 11 depicts an enlarged view of the longitudinal section through a lip comprising the anti-icing protection system according to a fourth embodiment.
Figure 12:
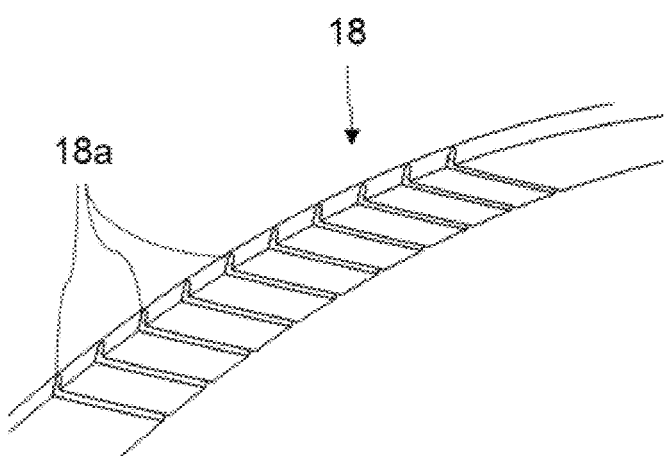
FIG. 12 depicts a schematic view of a sealing device of the anti-icing protection system according to a fourth embodiment.

According to a fourth embodiment of the invention illustrated in FIG. 10, FIG. 11 and FIG. 12, the heat exchanger device 11 further comprises a heat-transfer fluid and at least one evaporator 12a thermally connected to the heat source and fixed on the internal face 7a of the lip 7 by any suitable fixing means such as bonding or welding. The evaporator or evaporators 12a are configured to extract at least some of the heat 14 supplied by the heat source. The heat 14 is then transferred to the heat-transfer fluid (FIG. 10 and FIG. 11). According to one advantage of the invention, the evaporator or evaporators 12a are in direct contact with the heat 14 supplied by the heat source, thereby particularly improving the efficiency of the heat exchanger device 11.

The heat exchanger device 11 also comprises at least one condenser 12c fixed to the inner shroud 5. The heat 14 extracted by the evaporator or evaporators 12a is transferred to the condenser or condensers 12c via the heat-transfer fluid. The condenser or condensers 12c are configured to deliver at least some of the heat 14 extracted by the evaporator or evaporators 12a to the acoustic panel or panels 6.

Advantageously, the honeycomb structure of the acoustic panel is machined in such a way as to exhibit grooves 61c into which the condenser or condensers 12c are inserted, as illustrated in FIG. 11. According to this embodiment, the lip 7 is perforated in line with the acoustic panel 6 so that the sound waves can enter the honeycomb structure 6b of the acoustic panel 6. Despite the presence of the condensers 12c, the acoustic panel 6 thus retains its functionality.

For preference, the condensers 12c are distributed over the entire inner shroud 5.

Each of the evaporators 12a is fluidically connected to at least one condenser 12c by at least one heat pipe 12 (FIG. 10 and FIG. 11).

Advantageously, as depicted in FIG. 11, the heat pipe or heat pipes 12 also comprise at least one liquid pipe 12b configured to convey, from the condenser 12c to the evaporator 12a, the heat-transfer fluid liquefied by cooling in the condenser 12c.

Advantageously, the heat pipe 12 is a pulsating heat pipe or a loop heat pipe (LHP).

The liquid pipe 12b may be a pipe allowing the liquefied heat-transfer fluid to return to the evaporator 12a, or allowing the gasified heat-transfer fluid to return to the condenser 12c by gravity or capillary action.

The lip 7 has an annular space 8 which is closed by a front frame 9. The front frame 9 separates the annular space 8 from the rest of the space formed between the two shrouds 4 and 5. The lower part of the front frame 9 is not fixed to the internal face 7a of the lip 7 but is fixed to a sealing device 18 interposed between the heat pipe or heat pipes 12 and the lower part of the front frame 9. This sealing device 18 ensures that the heat 14 remains confined in the annular space 8 and does not therefore spread into the space formed between the two shrouds 4 and 5.

Advantageously, the lower part of the front frame 9 has a shape that curves towards the inside of the nacelle 2 and has a flat to which the sealing device 18 is fixed (FIG. 10).

The sealing device 18 depicted in FIG. 12 is shaped to suit the shape of the heat pipe or heat pipes 12. It may take the form of a plate comprising notches 18a having the same shapes and dimensions as the liquid pipes 12b of the heat pipe or heat pipes 12. It is preferably manufactured from a metal able to withstand the heat 14, such as titanium, for example. This sealing device 18 is secured to the air intake lip 7 and to the front frame 9 by any conventional fixing means.

In general, the annular space 8 is composed of two D-ducts forming a ring which is located just behind the leading edge.

The annular space 8 of the lip is designed to receive a hot air 10 supply (FIG. 10).

According to one embodiment, the heat source corresponds to the hot air 10 supplied to the annular space 8 of the lip 7.

Advantageously, at least one heat pipe 12 is configured to transfer the heat 14 from the internal face 7a of the lip 7 to the acoustic panel or panels 6.

The evaporator or evaporators 12a are thus configured to extract at least some of the heat 14 supplied by the hot air 10 supplied to the annular space 8 of the lip 7. The heat 14 is then transferred to the heat-transfer fluid (FIG. 10 and FIG. 11).

For preference, the evaporators 12a are distributed over the entire internal face 7a of the lip 7.

The hot air 10 supplied to the annular space 8 may come from an aircraft air-heating device 19. The air-heating device 19 is configured to produce the hot air 10 supplied to the annular space 8 of each of the nacelles 2.

For example, the aircraft comprises at least one duct 20 connecting the air-heating device or devices 19 to the annular space 8 of each of the nacelles 2. The duct or ducts 20 are configured to convey the hot air 10 produced by the air-heating device 19 to the annular space 8 of the lip 7. The aircraft also comprises at least one valve 21 for each of the ducts 20 which is configured to regulate the pressure and the flow rate of the hot air 10 flowing through the duct or ducts 20.

The duct or ducts 20 may correspond to nozzles or piccolo tubes.

For example, the air-heating device 19 corresponds to compression stages of the engine 3 surrounded by the nacelle 2. Thus, the compression stages of an engine 3 supply hot air 10 to the annular space 8 of the lip 7 of the nacelle 2 which surrounds the engine 3.

Thus, the heating device 19 supplies hot air 10 to the annular space 8 of the lip 7. The hot air 10 then flows through the annular space 8 of the lip 7. The heat of the hot air 10 is then extracted by the evaporator or evaporators 12a fixed to the internal face 7a of the lip 7. To do this, the heat-transfer fluid in the evaporator or evaporators 12a is vaporized and is conveyed to the condenser or condensers 12c by the liquid pipe or pipes 12b of the heat pipe or heat pipes 12. The heat is therefore transmitted to the acoustic panels 6 via the condenser or condensers 12c in which the heat-transfer fluid is liquefied, supplying the heat to the condensers 12c. The liquefied heat-transfer fluid then returns to the evaporator or evaporators 12c via the heat pipe or heat pipes 12.

This protection system 1 allows heat to be transferred effectively from the internal face 7a of the lip 7 to the acoustic panels 6. Furthermore, because of the direct contact between the evaporator or evaporators 12c and the heat 14 supplied by the hot air 10 supplied to the annular space 8 of the lip 7, the protection system 1 allows the heat of the hot air to be used directly and therefore allows the heat 14 supplied by the hot air 10 to be used more effectively.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine nacelle comprising an anti-icing protection system for the aircraft engine nacelle, the nacelle comprising:
    an inner shroud provided with at least one acoustic panel,
    wherein the anti-icing protection system comprises a heat exchanger device including at least one heat pipe configured to transfer heat emitted by a heat source to the at least one acoustic panel, the nacelle further comprising:
    a lip extended on an inside by the inner shroud provided with the at least one acoustic panel made up of a reflective layer impermeable to sound waves, of at least one honeycomb structure and of an acoustically resistive porous layer, said lip having an annular space closed off by a front frame provided with an orifice;
    means for blowing hot air into said annular space as well as a wall fixed to said front frame, arranged above the acoustic panel, and substantially parallel to said panel, said wall creating a canal that allows the hot air removed from the annular space to pass through the orifice; and
    the heat exchanger device comprising the at least one heat pipe comprising at least one evaporator arranged in contact with the reflective layer of the acoustic panel that is impermeable to sound waves, and at least one condenser, arranged near the acoustically resistive porous layer.

2. The aircraft engine nacelle according to claim 1, wherein the heat exchanger device further comprises:
    a heat-transfer fluid;
    the at least one evaporator connected thermally to the heat source;

the at least one evaporator being configured to extract at least some of the heat supplied by the heat source, the extracted heat being transferred to the heat-transfer fluid;

the at least one condenser positioned close to the acoustically resistive porous layer of the acoustic panel, the at least one condenser being configured to supply at least some of the heat extracted by the at least one evaporator to the at least one acoustic panel, the extracted heat being transferred to the at least one condenser via the heat-transfer fluid, the at least one evaporator being fluidically connected to at the least one condenser via the at least one heat pipe in which the heat-transfer fluid circulates.

3. The aircraft engine nacelle according to claim 2, wherein the at least one heat pipe comprises at least one liquid pipe configured to convey, from the evaporator to the condenser, the heat-transfer fluid vaporized by the heat extracted by the evaporator.

4. The aircraft engine nacelle according to claim 1, wherein the at least one heat pipe is a pulsating heat pipe.

5. The aircraft engine nacelle according to claim 1, wherein the at least one heat pipe is a loop heat pipes.

6. The aircraft engine nacelle according to claim 1, wherein the at least one heat pipe comprises at least one capillary tube containing a constant-volume fluid.

7. The aircraft engine nacelle according to claim 1, wherein the at least one heat pipe is substantially U-shaped.

8. The aircraft engine nacelle according to claim 1, wherein the at least one heat pipe is substantially S-shaped.

9. The aircraft engine nacelle according to claim 1, wherein the at least one heat pipe is arranged in an axial direction of the nacelle.

10. The aircraft engine nacelle according to claim 1, wherein the at least one heat pipe is arranged in a circumferential direction of the nacelle.

11. The aircraft engine nacelle according to claim 1, wherein the at least one evaporator is arranged inside the honeycomb structure, that layer of the acoustic panel that is reflective and impermeable to sound waves being manufactured from a material that is a conductor of heat.

12. The aircraft engine nacelle according to claim 1, wherein the at least one evaporator is arranged in the canal that allows the hot air removed from the annular space to pass through the orifice, in direct contact with said hot air.

13. The aircraft engine nacelle according to claim 1, wherein the at least one condenser is interposed between the honeycomb structure and the acoustically resistive porous layer.

14. The aircraft engine nacelle according to claim 1, wherein the at least one condenser is arranged in contact with the acoustically resistive porous layer, said layer being manufactured from a material that is a conductor of heat.

15. The aircraft engine nacelle according to claim 1, wherein the lip forms a leading edge of the nacelle, and comprises an internal face, the annular space of the lip being arranged to receive a hot air supply, the at least one evaporator being fixed to the internal face of the lip and being in contact with the hot air and being configured to extract at least some of the heat supplied by the hot air supplied to the annular space of the lip, the extracted heat being transferred to the heat-transfer fluid.

16. The aircraft engine nacelle according to claim 15, further comprising a sealing device interposed between the at least one heat pipe and a bottom part of the front frame.

17. The aircraft nacelle according to claim 16, wherein the sealing device comprises notches that have the same shapes and dimensions as the at least one liquid pipe.

* * * * *